June 24, 1930. G. R. RODDY 1,768,493
TROLLEY CONVEYER AND TRIP HOOK THEREFOR
Filed Oct. 24, 1928 4 Sheets-Sheet 2
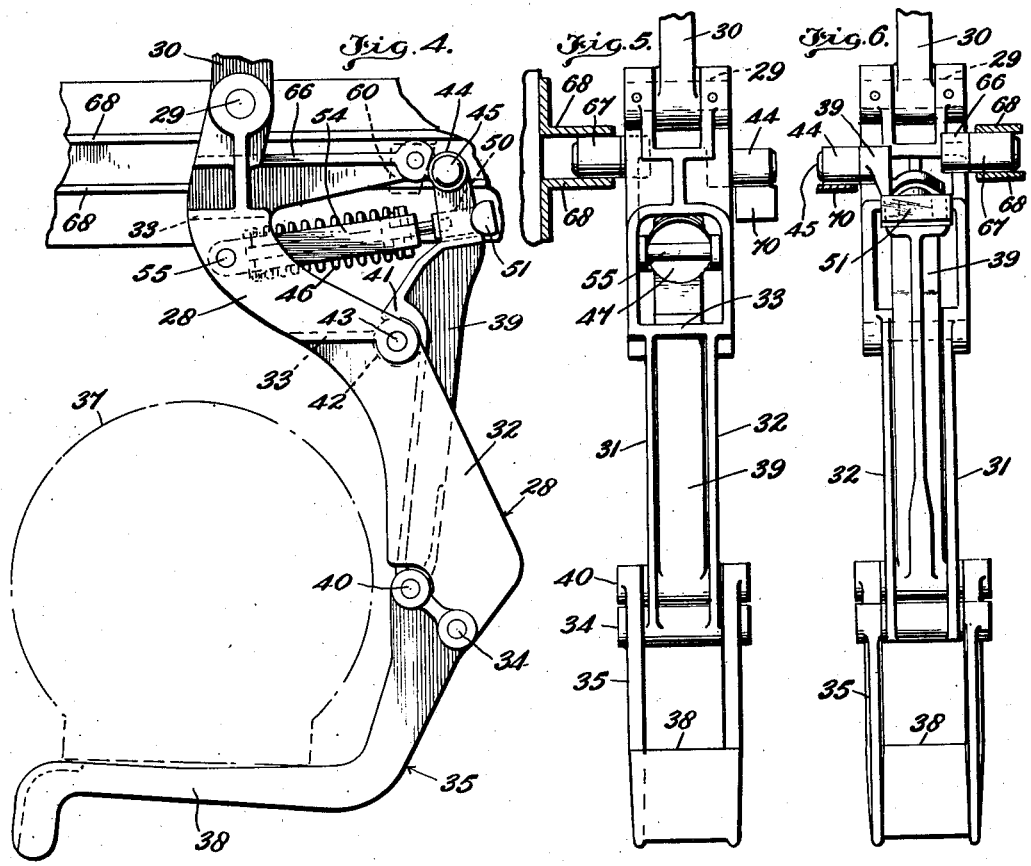
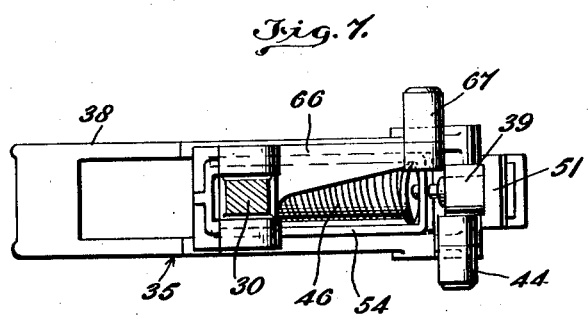
Inventor
Gustav R. Roddy,
By Barker & Collings
Attorneys

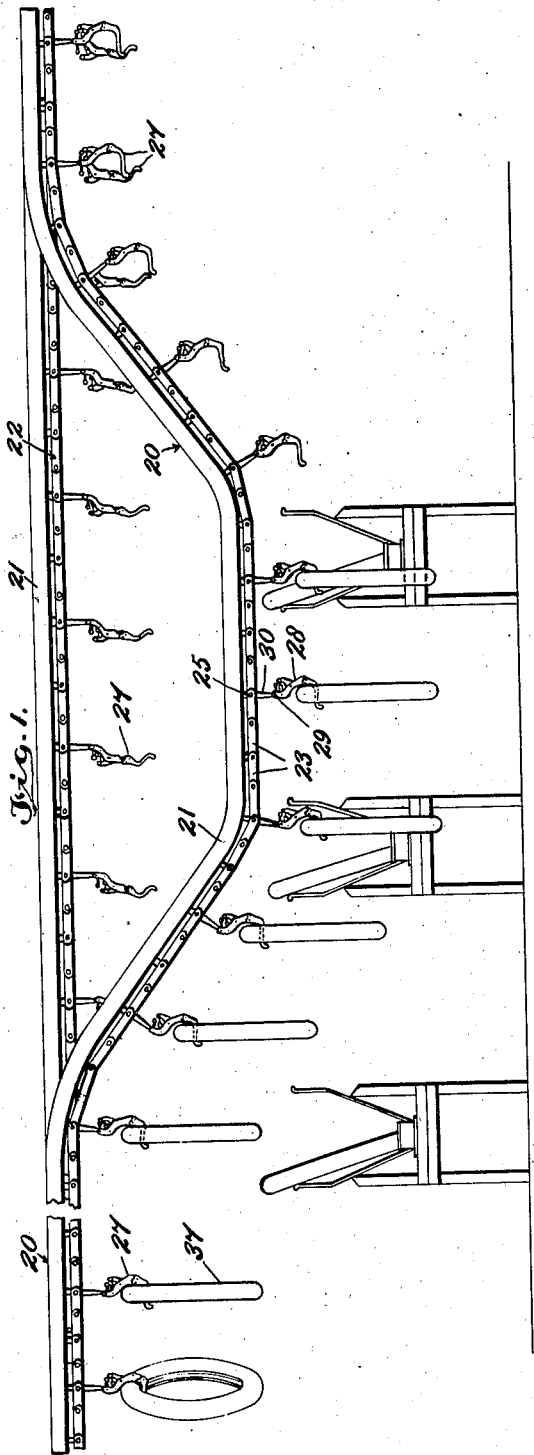
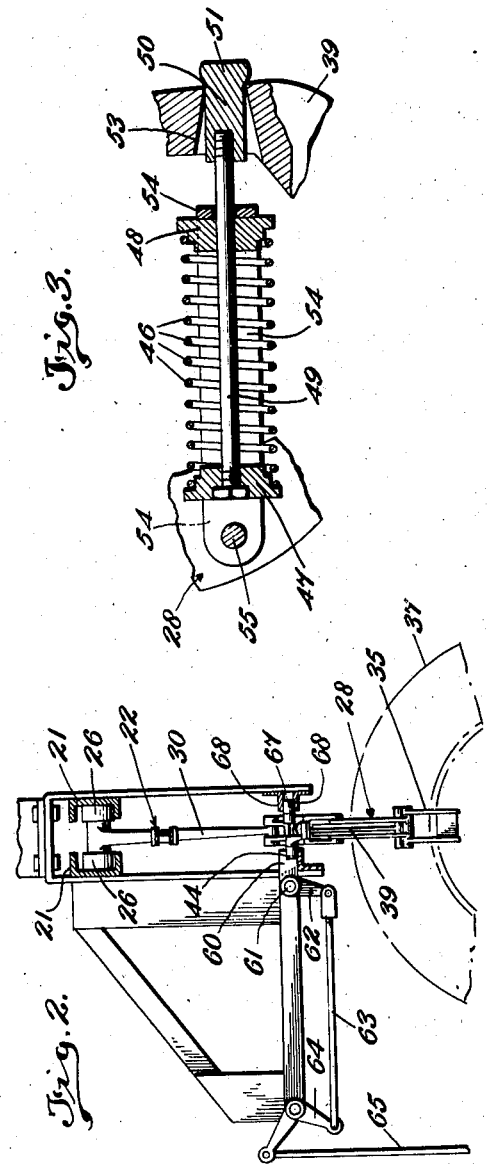

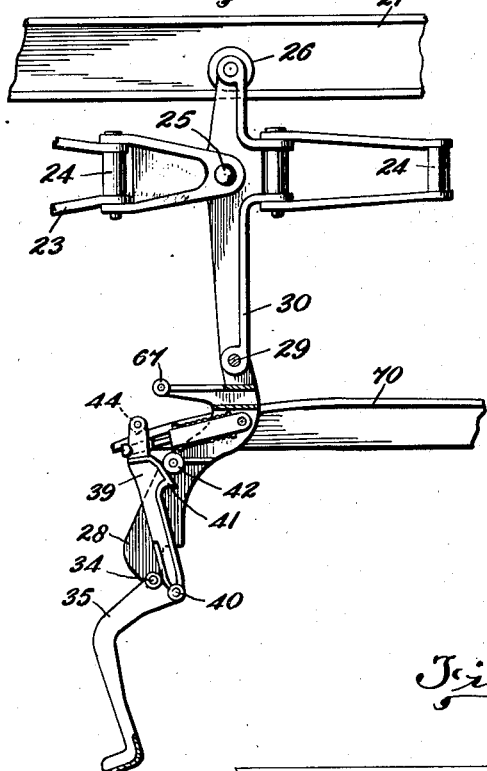
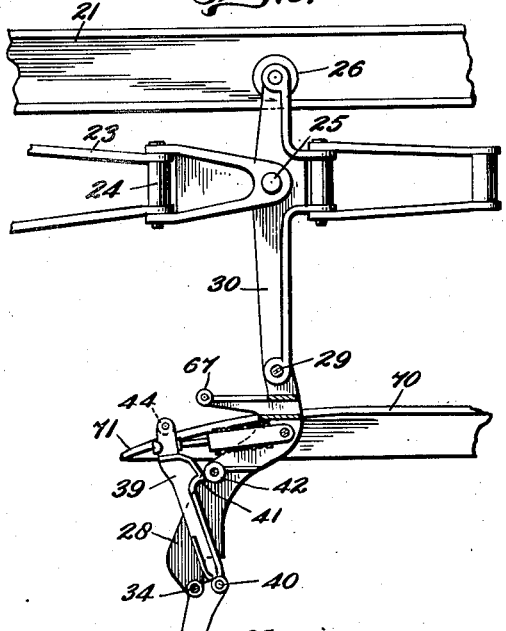
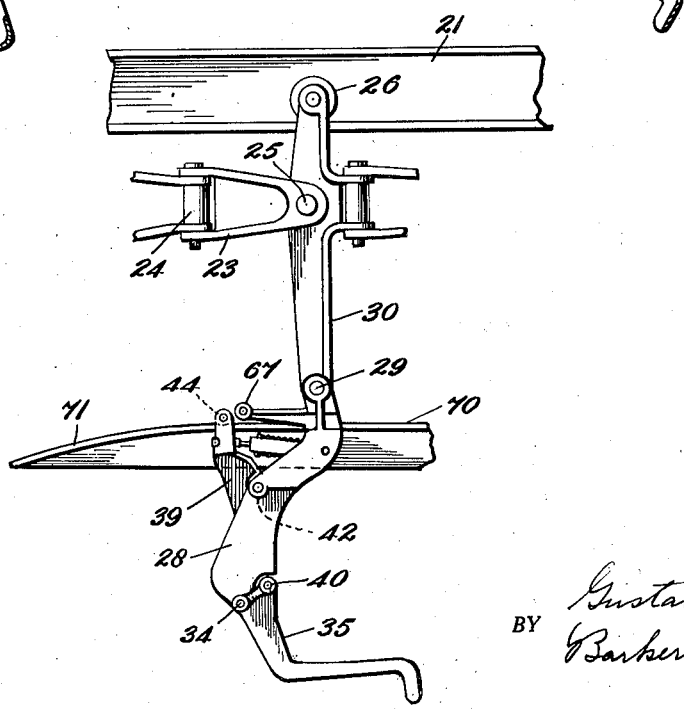

June 24, 1930.  G. R. RODDY  1,768,493
TROLLEY CONVEYER AND TRIP HOOK THEREFOR
Filed Oct. 24, 1928  4 Sheets-Sheet 4
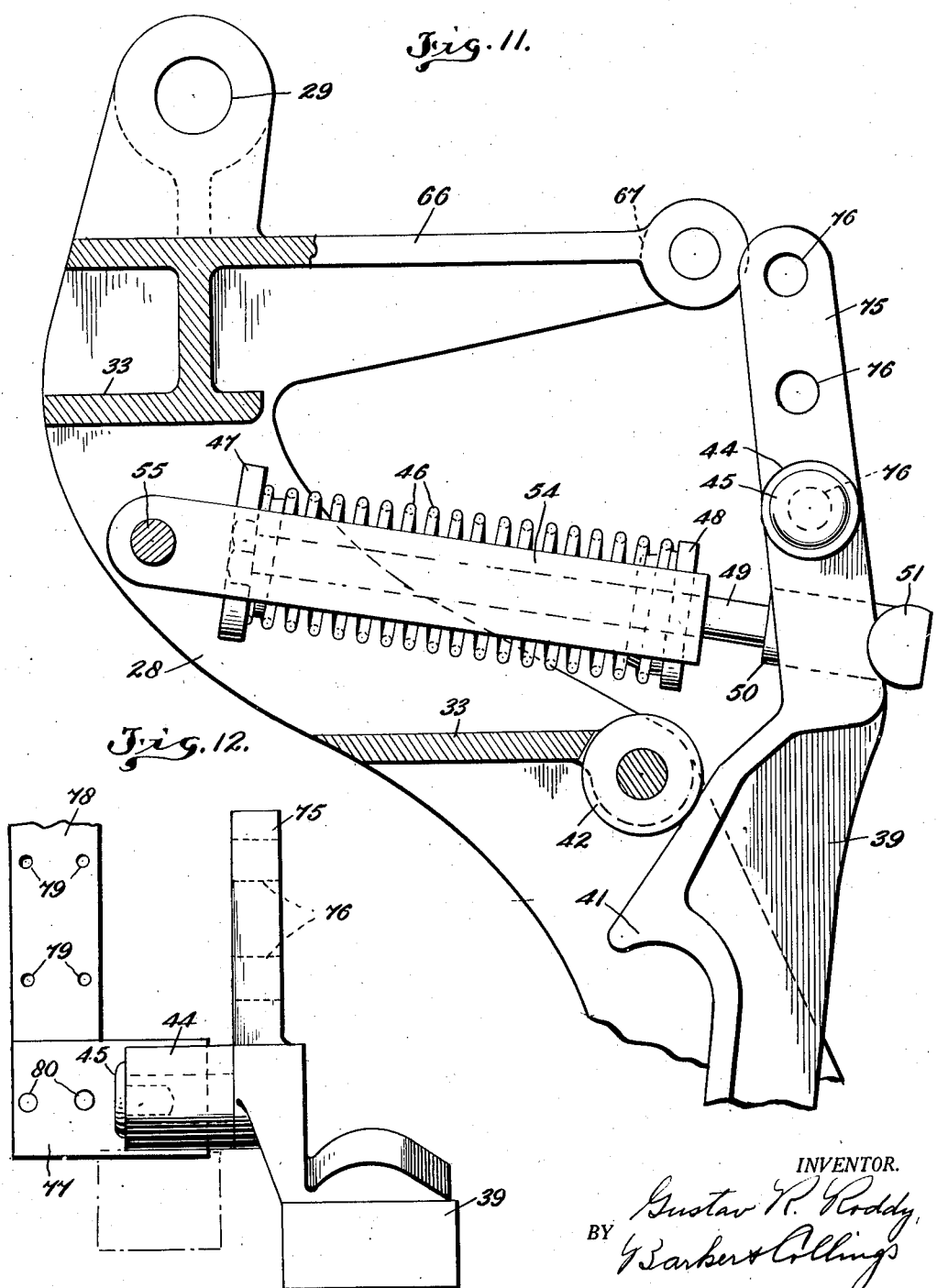
INVENTOR.
Gustav R. Roddy,
BY Barker & Collings
ATTORNEYS Patented June 24, 1930

1,768,493

UNITED STATES PATENT OFFICE

GUSTAV R. RODDY, OF MILWAUKEE, WISCONSIN, ASSIGNOR TO CHAIN BELT COMPANY, OF MILWAUKEE, WISCONSIN, A CORPORATION OF WISCONSIN

TROLLEY CONVEYER AND TRIP HOOK THEREFOR

Application filed October 24, 1928. Serial No. 314,728.

This invention relates to trolley conveyers and trip hooks therefor, and has for one of its objects to provide an improved conveyer of the selective delivery type in which the article carrying hooks or members are pivotally hung from the conveyer belt so that they may swing freely, means being provided, however, to prevent such swinging during the tripping and resetting of the trip latches of the hooks.

A further object of the invention is to improve the construction of the article carrying hooks or members, to the end that the latch springs and associated parts are housed within and protected by the more substantial portions of the hooks, thereby reducing the likelihood of derangement of these parts. A still further object is to provide a simple and effective means for selectively tripping the hook latches.

With the above and other objects in view, which will appear as the description proceeds, the invention consists in the novel details of construction and combinations and arrangements of parts more fully hereinafter disclosed and particularly pointed out in the appended claims.

While the invention is susceptible of use for conveying various types of articles, for illustrative purposes it has been shown in the accompanying drawings as comprising a conveyer system for automobile tires.

In the said drawings

Fig. 1 is a diagrammatic side elevational view of a conveyer system provided with trip hooks constructed in accordance with the present invention.

Fig. 2 is an enlarged cross sectional view illustrating one form of tripping mechanism for the hooks.

Fig. 3 is a fragmentary sectional view on enlarged scale illustrating the resilient connection between the latch and the body member of the hook.

Fig. 4 is an enlarged side elevational view of one of the trip hooks.

Fig. 5 is an end elevational view of the parts shown in Fig. 4 as seen from the left of the latter figure.

Fig. 6 is a view similar to Fig. 5 as seen from the right of Fig. 4.

Fig. 7 is a top plan view of the hook illustrated in Fig. 4.

Figs. 8, 9 and 10 are diagrammatic elevational views partly in section showing three positions of the hook during the resetting operation.

Fig. 11 is an enlarged fragmentary sectional elevational view of a somewhat modified form of the invention.

Fig. 12 is a fragmentary end elevational view of the form shown in Fig. 11.

Referring more particularly to Figs. 1 to 10 inclusive, the conveyer system comprises a trackway 20 composed of a pair of channel members 21, which trackway is supported in any suitable manner at the desired height above the floor. The said trackway 20 constitutes a guide and support for the power transmitting conveyer chain 22 which is preferably of the compound articulating type. That is to say, the individual chain links 23 are adapted to pivot in a horizontal plane about their vertical pintles 24, as they pass about the horizontally disposed sprockets of the conveyer system and the chain is further divided into sections composed of a plurality of links 23 which are also adapted to pivot at a vertical plane about horizontal pivots 25 whereby the chain may accommodate itself not only to changes of direction in a horizontal plane but also in a vertical plane. The chain is movably supported in the trackway 20 by rollers 26, as will be clear from Figs. 2, 8, 9 and 10. Inasmuch as the particular construction of the chain itself constitutes no part of the present invention it will not be described in further detail.

The chain 22 carries, at suitably spaced intervals, the trip hooks 27 which are adapted to receive and carry the articles to be transferred by the conveyer. These said hooks, as will be clear from the detail views, comprise a body member 28 pivotally secured as at 29 to an arm 30 depending from certain of the chain links. The said body member is preferably in the form of a bifurcated casting having the side walls 31 and 32 joined together at suitable points by reinforcing webs 33.

Pivotally secured to the body member 28 adjacent its lower end, as indicated at 34, is the article receiving and carrying member 35, here shown as comprising a substantially L-shaped arm. The tires or other articles indicated at 37 are adapted to rest upon the horizontal portion 38 of the said arm, as indicated in Fig. 4.

A latch member 39 is pivotally secured as at 40 to the upper end of the article carrying member 35 and extends upwardly between the side walls 31 and 32 of the body member. It is provided with a laterally extending toe 41 which is adapted to engage over a latch or detent roller 42 journaled as at 43 between the side walls of the body member. The said latch member extends upwardly beyond the toe 41 and is provided at or near its upper extremity with a trip member 44, here shown as comprising a roller journaled upon a stud 45, carried by the upper end of the latch member.

The toe 41 of the latch member is normally held in engagement with the detent roller 42 by a spring 46. The spring 46 as best shown in Fig. 3 is held between two heads 47 and 48, the former of which is carried by a rod 49 provided with a member 50 having a T-head 51 which engages the outer face of the latch member 39, as will be clear from the drawings. The member 50 passes through a flaring opening 53 formed through the latch member as clearly shown in Fig. 3, thereby permitting the pivoting movements of the rod 49 and member 50 as will be readily understood. The head member 48 is slidably mounted upon the rod 49 and is positioned within a U-shaped yoke 54, the free ends of which are pivotally connected as at 55 to the body member 28 of the hook.

The spring 46, being under compression between the two head members 47 and 48, will of course tend to force the head 47 toward the left, as viewed in Fig. 3, which force will be transmitted through the rod 49 and member 50 to the latch member 39, thereby normally tending to hold the latch in engagement with the detent roll 42. It will be apparent, however, that if a suitable dog or trip is interposed in the path of the roller 44 as the latter progresses toward the left, as viewed in Fig. 4, its progress will be stopped and the latch member 39 will have its toe 41 disengaged from the detent roll 42, whereupon the weight of the carrying member 38 and the article thereon will cause the said member to drop downwardly around its pivot 34 to a position such as that illustrated in Fig. 8. The article 37 would thereby be discharged from the carrying member, as will be readily apparent.

One form of the dog for tripping the latch is diagrammatically illustrated in Fig. 2 as comprising an arm 60 pivotally mounted as at 61 and adapted to be moved into and out of the path of the tripping roll 44 by means of a lever 62 rigidly connected to the pivot shaft 61. A link 63 extends from the said lever 62 to one arm of a bell crank member 64, the other arm of which carries a link 65 which may be either manually or automatically actuated as desired. Obviously by moving the link 65 downwardly the link 63 will be moved toward the right, as viewed in Fig. 2, and the trip member 60 raised out of the path of the tripping roll 44, whereby it is possible for any particular hook to pass the tripping mechanism without being tripped.

During the tripping action above described, as well as during the resetting action to be later described the carrying hook members are apt to be swung about their pivotal connections 29 with the conveyer chain, unless some means is provided to prevent such swinging motion at this time. It is highly desirable to prevent such swinging motion, for if the hooks are permitted to swing it is possible that they may be deflected to such an extent that the latches will not trip and the hook will pass the tripping mechanism, even though the latter is set, without depositing the article carried thereby. To prevent such swinging motions the body member 28 of the hook is provided with a laterally extending arm 66, which carries a roller 67 adapted to enter between suitable guides 68 positioned adjacent the tripping mechanism disclosed in Fig. 2. Inasmuch as the roller 67 is offset from the pivotal connection 29 of the body member with the chain, it will effectively prevent any swinging movements of the body member during the time it is passing between the guides 68.

After the hooks have been tripped as above described and have deposited the articles carried thereby it is of course desirable to automatically reset them before they again reach the loading station, and for this purpose there is provided a cam or guide 70 located at a suitable point in the travel of the conveyer. This resetting cam or guide is located so as to be engaged by the tripping roller 44 in its lowest position, and said guide, as will be clear from Figs. 8, 9 and 10, is provided with an inclined surface 71 by which the roller 44 travels from the position shown in Fig. 8 to that shown in Fig. 9 and then to that shown in Fig. 10. This upward travel of the roller 44 has the effect of lifting the latch member 39 from its tripped position shown in Fig. 8 to the point where its toe 41 will again engage over the detent roll 42, it being normally urged into such engagement by the compression spring 46. As soon as the resetting has been accomplished the roller 44 will pass off the resetting member 70.

It will be apparent from the foregoing that articles carried by the trip hooks 27 may be selectively discharged from said hooks at varying stations along the travel of the conveyer, the discharge depending upon whether or not the trip member 60 is located in the path of the trip roll 44, or whether it has been raised out of such path.

In Figs. 11 and 12 there is shown a slightly modified form of tripping mechanism for the latch, in which the tripping action will depend upon the particular elevation of the tripping member, that is to say, as will be clear from Fig. 11, the latch 39 is provided with an upward extension 75, which has a plurality of apertures 76 therein which apertures are adapted to receive the stud 45 on which the tripping roll 44 is mounted. The tripping dog in this case may have the form of a rigidly mounted plate or member 77, carried by a suitable support 78 as shown in Fig. 12. The dog 77 may be positioned in any one of three or more different elevations as indicated by the hole 79 shown in the support 78 for receiving the pins 80 to secure the dog to the support. Obviously if a trip hook having the tripping roller mounted in the lowermost hole 76 approaches a tripping mechanism in which the tripping dog occupies the lowermost position on the support 78, the latch of such hook will be tripped; while on the other hand if a particular hook is provided with a roll mounted in one of the upper holes 76 such roll will clear the tripping member 77 and the hook will not be tripped. By varying the positions of the tripping rolls 44 and the tripping dog 77 it is possible to determine which hooks may be tripped at each particular station.

Going back to the particular construction of the hooks, it will be noted that the springs and detent rolls, which are relatively delicate parts of the mechanism, are located between the side walls of the body members 28 of the hooks wherein they are effectively housed and protected against injury and derangement which might occur if these members were more exposed.

It is obvious that those skilled in the art may vary the details of construction as well as the precise arrangement of parts without departing from the spirit of the invention and therefore it is not wished to be limited to the above disclosure except as may be required by the claims.

What is claimed is:

1. In a conveyer, a conveyer belt; article carrying means carried by said belt, comprising a body member transversely pivotally connected to said belt, an article-receiving member carried by said body member, and a latch for releasably holding said receiving member in carrying position; means for tripping said latch to release said receiving member; and means for preventing the swinging of said body member about its pivot during the tripping of the latch.

2. In a conveyer, a conveyer belt; article carrying means carried by said conveyer belt, comprising a body member pivotally connected to said belt, said body member being provided with a projection, a gravity actuated article-receiving member pivotally carried by said body member, and a latch pivotally carried by said receiving member and releasably engaging said body member, for normally maintaining said receiving member in carrying position; means for tripping said latch to release said receiving member; and means for engaging said body member projection to prevent tilting movements of said body member about its pivotal connection to said belt during the tripping of the latch.

3. In a conveyer, a conveyer belt, article carrying means carried by said conveyer belt, comprising a body member having a projection, said body member being pivotally connected to said belt, a gravity actuated article-receiving member pivotally carried by said body member, and a latch pivotally carried by said receiving member and releasably engaging said body member for normally maintaining said receiving member in carrying position; means for tripping said latch to release said receiving member; means for engaging a portion of said latch and lifting it together with said receiving member to restore the parts to normal carrying position; and means for engaging the projection on said body member to prevent tilting movement of the latter about its pivotal connection to said belt during said restoring operation.

4. A trip hook for trolley conveyers comprising a body member adapted to be pivotally secured to a conveyer chain, said member being provided with a rigid angularly extending arm; an article-receiving member pivotally connected to said body member, adapted under the influence of gravity to swing downwardly from a carrying to a discharging position; a detent carried by said body member; a latch member pivotally carried by said receiving member, provided with a toe adapted to engage said detent to hold said receiving member in carrying position; a tripping and resetting projection carried by said latch; and means carried by the angularly extending arm of said body member for engaging a guide during the latch tripping and resetting operations to prevent swinging movements of said body member about its pivotal connection with said chain.

5. A trip hook for trolley conveyers comprising a bifurcated body member adapted to be secured to a conveyor chain; an article-receiving member pivotally carried by said body member, adapted under the influence of gravity to swing from a carrying to a discharging position; a detent roller mounted between the side walls of said body member; a latch member pivotally carried by said receiving member and passing between said side walls of said body member, said latch member being provided with a toe adapted to engage said detent roller to hold said receiving member in carrying position; and resilient means partially housed between the side walls of said body member, for holding said latch against said detent roller.

6. A trip hook for trolley conveyers comprising a body member adapted to be secured to a conveyer chain; an article-receiving member pivotally connected to said body member; a detent carried by said body member; a latch member pivotally carried by said receiving member, adapted to engage said detent to hold said receiving member in carrying position; a yoke pivotally carried by said body member; a pin pivotally connected to said latch member and slidably entering said yoke, said pin being provided with a head within said yoke; and a spring interposed between said head and a portion of said yoke.

7. A trip hook for trolley conveyers, comprising a body member adapted to be secured to a conveyer chain; an article-receiving member pivotally connected to said body member, adapted under the influence of gravity to swing downwardly from a carrying to a discharging position; a detent carried by said body member; a latch member pivotally carried by said receiving member, adapted to engage said detent to hold said receiving member in carrying position; and a selective tripping and resetting member adjustably carried by said latch.

8. A trip hook for trolley conveyers, comprising a body member adapted to be secured to a conveyer chain; an article receiving member pivotally connected to said body member, adapted under the influence of gravity to swing downwardly from a carrying to a discharging position; a detent carried by said body member; a latch member pivotally carried by said receiving member adapted to engage said detent to hold said receiving member in carrying position, said latch member having a plurality of spaced apertures; and a tripping member adapted to be positioned in any one of said apertures, whereby said latch may be selectively tripped and reset.

In testimony whereof I affix my signature.

GUSTAV R. RODDY.